United States Patent [19]

Gardner

[11] Patent Number: 4,846,029
[45] Date of Patent: Jul. 11, 1989

[54] SHEARING METHOD AND APPARATUS

[75] Inventor: John A Gardner, Wolverhampton, West Midlands, United Kingdom

[73] Assignee: Mechatherm Engineering Limited, Kingswinford, United Kingdom

[21] Appl. No.: 157,908

[22] Filed: Feb. 19, 1988

[30] Foreign Application Priority Data

Mar. 5, 1987 [GB] United Kingdom ............... 8705096

[51] Int. Cl.$^4$ .................. B23D 23/00; B26D 3/16
[52] U.S. Cl. ................................ 83/13; 83/23; 83/123; 83/198; 83/456; 83/567
[58] Field of Search ............... 83/196, 198, 13, 23, 83/456, 461, 382, 580, 639, 567, 123

[56] References Cited

U.S. PATENT DOCUMENTS

| | | | |
|---|---|---|---|
| 3,621,745 | 11/1971 | Cavalan et al. | 83/198 |
| 4,063,483 | 12/1977 | Kawaguchi et al. | 83/382 |
| 4,152,959 | 5/1979 | Elhaus | 83/198 X |
| 4,385,538 | 5/1983 | Bieri et al. | 83/196 X |

FOREIGN PATENT DOCUMENTS

| | | | |
|---|---|---|---|
| 0749578 | 7/1980 | U.S.S.R. | 83/198 |
| 0764880 | 9/1980 | U.S.S.R. | 83/198 |

Primary Examiner—Frank T. Yost
Assistant Examiner—Hien H. Phan
Attorney, Agent, or Firm—Klarquist, Sparkman, Campbell, Leigh & Whinston

[57] ABSTRACT

A heated aluminum log which is to be sheared is inserted through a stationary die and a movable die. A clamp of the stationary die is then moved towards an axis of that die to clamp the log against a diametrically opposite portion of the internal surface of the stationary die. Opposite members of the stationary die are then moved towards each other in a direction perpendicular to the direction of movement of the clamp, to limit expansion of the sheared log. The movable die is then moved to shear the log.

8 Claims, 1 Drawing Sheet

SHEARING METHOD AND APPARATUS

BACKGROUND TO THE INVENTION

The present invention relates to shearing and is primarily concerned with shearing elongated, metal bodies into billets which are to be extruded.

The shearing of an elongated, generally cylindrical body of aluminum (usually called a log) into billets is effected by passing a portion of the log through a pair of aligned, juxtaposed dies and then causing relative movement of the dies in a direction perpendicular to the length of the log. Because difficulties have been experienced in passing the log through aligned dies, it has been proposed in U.S. Pat. No. 4,152,959 issued May 8, 1979 to F. W. Elhaus to use a die which is formed in two relatively movable parts. In U.S. Pat. No. 4,063,483 issued Dec. 20, 1977 to Kawaguchi et al, there is disclosed apparatus comprising two juxtaposed dies, each of which can be opened by pivoting an upper die part away from a corresponding lower die part.

In use of the apparatus disclosed in the Elhaus patent and in use of the apparatus disclosed in the Kawaguchi et al patent, the dies are expanded by movement of the die parts away from each other to facilitate movement of the logs through the dies and the dies are then contracted, prior to shearing. These prior proposals facilitate movement of a log through the dies and would be satisfactory, if all logs had exactly the same diameter. However, there is variation in the diameter of logs which have the same nominal diameter. If a die is constructed to close when it contains a log having a larger diameter, there will be a clearance between the die and a smaller diameter log having the same nominal diameter. The clearance which then exists permits movement of the smaller log relative to the die during shearing so that a coaxial relation between the log and the die is not maintained. One consequence of this is that the sheared face of the log may not be at right angles to the longitudinal axis of the log. The log may suffer deformation or other damage or may damage the equipment if the log is permitted to move in the die during shearing.

SUMMARY OF THE INVENTION

According to a first aspect of the invention, there is provided a method of shearing an elongated body wherein first and second dies are mutually aligned, the body is introduced into the dies, there being a clearance between the body and the first die at at least one position around a longitudinal axis of the body and there being a clearance between the body and the second die at at least one position around the longitudinal axis of the body, at least the first die is then contracted by movement of a clamp portion of the internal surface of the die towards an opposite portion of that internal surface to clamp the body in the first die, the body is sheared by relative movement of the dies in the direction of said movement of the clamp portion towards the opposite portion of the internal surface and the first die is subsequently expanded, at least in said direction, to release the log.

The invention enables proper control of a log to be achieved during shearing, even in cases where the actual diameter of the log varies somewhat from the nominal diameter.

The first die is preferably contracted and expanded also in a direction transverse to the direction of relative movement of the dies for shearing. Contraction of the first die in said transverse direction prior to shearing limits the expansion of the body in the transverse direction which is caused by shearing. If the first die is always contracted to the same size, the same limits will be imposed on transverse expansion of successive logs having respective diameters which differ.

To facilitate movement of the body through the aligned dies, the second die also may be expanded prior to longitudinal movement of the body and then contracted, in at least the direction of relative movement of the dies, prior to shearing.

According to a second aspect of the invention, there is provided apparatus suitable for shearing elongated metal bodies and comprising first and second juxtaposed dies which receive a body to be sheared and which undergo relative movement to shear the body, wherein the first die is an assembly comprising a pair of opposite die members and a clamp, each of the opposite die members and the clamp presents a respective contact surface for engagement with the body received by the die, said contact surfaces are spaced in respective different directions from an axis defined by the first die, the die members are movable towards and away from each other and the clamp is movable towards and away from the axis of the first die independently of the die members.

In the preferred apparatus, a plane which is perpendicular to the first die axis intersects each of said contact surfaces. The contact surfaces of the die members and of the clamp may all extend substantially to the interface between the first and second dies.

The contact surface of each of the die members preferably subtends at the axis of the first die an angle which is within the range of 90° to 160°.

The contact surface of each of the die members preferably includes a portion which is substantially parallel to the direction of movement of the die members towards and away from each other. In a case where this direction is horizontal, such a portion will remain at the same level during movement of the die embers and is therefore able to support the body to be sheared at substantially the same level when the die members are moved apart and when the die members are moved towards each other.

BRIEF DESCRIPTION OF THE DRAWINGS

Apparatus embodying the second aspect of the invention and which is used in a method according to the first aspect of the invention will now be described, with reference to the accompanying drawing, wherein.

Figure 1:
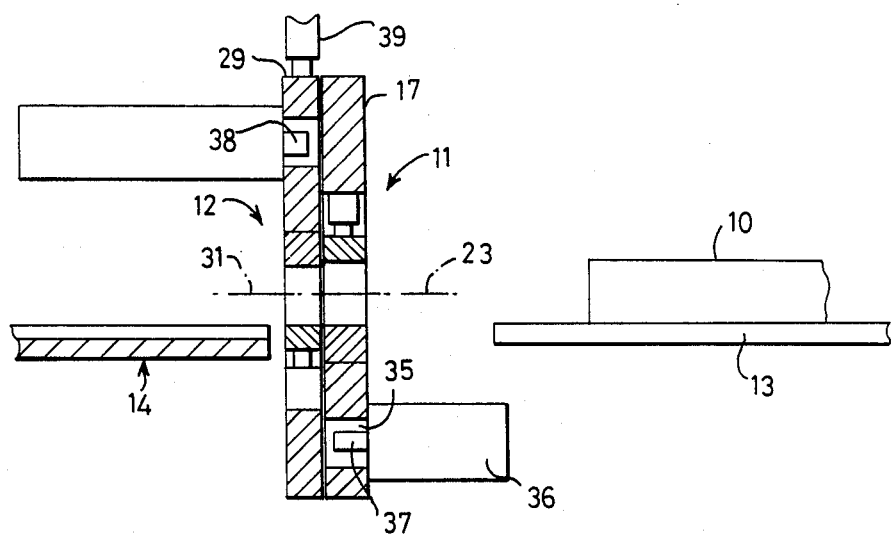
FIG. 1 is a diagrammatic representation of the apparatus, shown partly in cross-section in a plane containing an axis of a stationary die of the apparatus.
Figure 3:
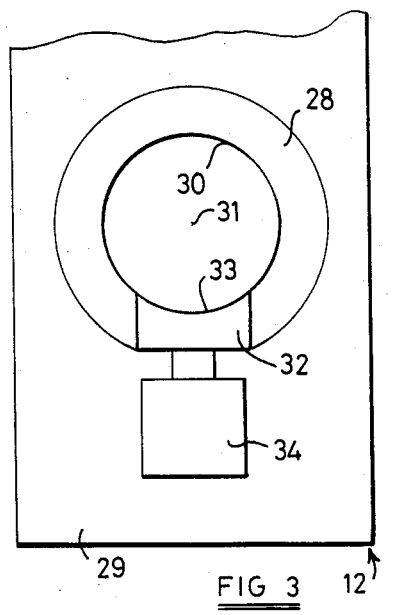
FIG. 3 is a diagrammatic representation of a view of a movable die, also viewed in a direction along its axis.

The apparatus illustrated in the drawing is intended for use in dividing a heated log 10 of aluminum into billets. The log typically has a diameter in the region of 150–200 mm and a length of several meters.

The apparatus comprises a pair of juxtaposed dies 11 and 12 which can be mutually aligned, as shown in FIG. 1. Conveying means 13 is provided for conveying the log 10 to the dies and passing the log partly through the dies so that one end portion of the log protrudes to the left of the die 12, as viewed in FIG. 1 while a further part of the log protrudes to the right of the die 11, as viewed in FIG. 1. The conveying means may be of known construction and includes a furnace (not shown) for heating the log in a known manner. The conveying means defines a rectilinear path of travel for the log and an extension of this path passes through the dies 11 and 12 and along a cradle 14 associated with the movable die 12. Known means are provided for moving the log along this path. Such means may comprise pushers at opposite ends of the path or driven rollers or a combination of these.

The die 11 comprises first and second, opposite die members 15 and 16 which are mounted on a frame 17 by guide means 18 arranged for guiding the die members for movement relative to the frame towards and away from each other. Hydraulic cylinders 19 and 20 mounted on the frame 17 are arranged for moving the die members 15 and 16 respectively from the positions illustrated in FIG. 2, called herein the closed position, in which the die members are in mutual contact at an interface 21 to a position, called the open position, in which there is a gap of several millimetres between the die members 15 and 16. Typically, the gap between the die members, when in the open position, is within the range of 2 to 5 millimeter and is more preferably 3 to 4 millimeter.

The die member 15 has a part-cylindrical contact face 22 which forms a part of the internal surface of the die and contacts the log 10 during use of the apparatus for shearing the log. When the die members 15 and 16 are in the closed position, the axis of curvature of the contact face 22 coincides with an axis 23 of the die. The contact face subtends at this axis an angle which is less than 180° but greater than 90°. Preferably the angle subtended at the axis 23 by the contact face does not exceed 160°. It will be noted that, immediately adjacent to the interface 21, the contact face 22 extends in the direction of movement of the die member 15 relative to the frame 17 from the closed position to the open position. In the example illustrated, this direction is horizontal. Accordingly, the level of the die members 15 and 16 is not changed by movement between the open and closed positions.

The die member 16 has a part-cylindrical contact face 24 which corresponds to the contact face 22 of the die member 15. The contact face 24 has the same radius of curvature as and subtends at the axis 23 the same angle as does the contact face 22.

The die 11 further comprises a clamp 25 which lies between the die members 15 and 16 at a position diametrically opposite to the interface 21. The clamp has a part-cylindrical contact face 26 with a radius of curvature substantially equal to that of the contact face 22 and defining an axis of curvature which can be moved into coincidence with the die axis 23. The clamp 25 is mounted on the frame 17 for movement relative thereto towards and away from the axis 23 between an advanced position in which the contact face 26 is spaced from the axis 23 by a distance less than the radius of curvature of the contact face 22, and a retracted position in which the contact face 26 is spaced from the die axis 23 by a distance exceeding the radius of curvature of the contact face 22. A piston and cylinder unit 27 is provided for moving the clamp relative to the frame and guide means is provided for guiding the clamp for movement relative to the frame along a rectilinear path which is perpendicular to the direction of movement of the die members 15 and 16.

Adjacent to the contact face 26, the clamp 25 has a width, measured in the direction of movement of the die members 15 and 16, which is equal to the spacing between adjacent parts of these members, when in the closed position. Accordingly, when the die members 15 and 16 are in mutual contact at the interface 21, they are both in contact with the clamp 25. It will be noted that the contact faces 22, 24 and 26 do not overlap each other around the axis 23. Furthermore, each of these contact faces extends substantially the same distance from the interface between the dies 11 and 12 in a direction along the axis 23. The three contact faces lie at the same position along that axis and lie in different directions from the axis. The aforesaid width of the clamp is typically equal to the radius of curvature of the contact face 22.

The die 12 comprises a die member 28 which is fixedly mounted on a frame 29 and which has a part-cylindrical contact face 30 which presents the major part of the internal face of the die 12, subtending at an axis 31 of that die an angle in excess of 180°. The angle subtended by the contact face 30 at the axis 31 preferably exceeds 270°. The radius of curvature of the contact face 30 is typically slightly greater than the radius of curvature of the contact face 22 and may exceed this radius by one half of the distance between the die members 15 and 16, when these members are in the open position.

The die 12 further comprises a clamp 32 having a part-cylindrical contact face 33 which constitutes the remainder of the internal face of the die 12. The clamp 32 is mounted on the frame 29 for movement by means of a piston and cylinder unit 34 relative thereto towards and away from the axis 31 from a clamping position in which the clamp is somewhat nearer to that axis than is the contact face 30, to an open position in which the clamp is spaced at least as far from the axis 31 as is the contact face 30.

The clamp 32 is spaced from the axis 31 in a direction opposite to that in which the clamp 25 is spaced from the axis 23. The clamps are movable along mutually parallel paths, which, in the example illustrated, are vertical.

The die 12 is guided for movement relative to the die 11 from the coaxial position illustrated in FIG. 1 to a position in which the axis 31 lies below the axis 23. The stroke of the movable die 12 may exceed the diameter of the dies. There is formed in the frame 17 an opening 35 which lies directly below the axis 23 and which is aligned with the opening of the movable die 12 when that die reaches the limit of its downward stroke. On the frame 17, there is mounted an hydraulic ram 36 having an ejector 37 which lies in the opening 35 and which can be projected through the movable die 12 to eject therefrom a billet on to the cradle 14. It will be understood that the cradle 14 moves upwardly and downwardly with the movable die. In the frame 29, there is provided a similar opening through which a pusher 38 can be projected to push back from the stationary die 11 the remainder of a log from which a billet has been sheared. The pusher 38 also participates in upward and downward movement of the die 12 relative to the die 11. Alternatively, the pusher 38 may be mounted in a position aligned with the axis 23.

Prior to commencement of a shearing operation, the dies 11 and 12 are moved into co-axial relation. The die members 15 and 16 are in the open position, the clamp 25 is withdrawn in a direction away from the axis 23 and the clamp 32 is withdrawn in a direction away from the axis 31. The conveying means 13 is then operated to pass a portion of the log 10 through the dies until a predetermined length of the log lies to the left of the interface between the dies 11 and 12, as these are viewed in FIG. 1. Whilst the clamp 32 is withdrawn, the lowest part of its contact face 33 lies at the same level as do those parts of the contact faces 22 and 24 which are immediately adjacent to the interface 21. This facilitates insertion of the log through the dies. The radius of curvature of the contact face 22 is selected to ensure that this radius is no less than the radius of the thickest logs which may be required to be sheared. Accordingly, whilst the die members 15 and 16 are in the open position, the log can extend between these with clearances at opposite sides. There is also a clearance between the log and the retracted clamp 25 and clearance between the log and the entire contact face 30. Even in a case where the log is bent or otherwise deformed, there will be sufficient clearance to facilitate movement of the log through the dies without such movement being impeded significantly by contact between the log and the internal faces of the dies.

Once the log has been moved longitudinally to the required position, the piston and cylinder units 27 and 34 are operated to lower the clamp 25 on to the log and raise the clamp 34 relative to the die member 28. The log is thereby clamped against the die members 15 and 16 adjacent to the interface 21 and against the die member 28 at a position diametrically opposite to the clamp 32. The cylinders 19 and 20 are then pressurised to return the die members 15 and 16 to the closed position. In a case where the log is of maximum diameter, this will bring the contact faces 22 and 24 into substantially continuous contact with the log. In a case where the log has a smaller diameter, there may remain some clearance between the log and the contact faces 22 and 24.

An hydraulic shearing ram 39 which acts between the frames 17 and 29 is then operated to move the die 12 downwardly relative to the die 11 and shear the log. The maximum pressure is exerted on the uppermost part of the log by the die member 28 and on the lowermost part of the log by the die members 15 and 16 collectively. This tends to tip the log in an anticlockwise direction, as viewed in FIG. 1 but such tipping is prevented by the clamp 25 and either or both of the clamp 32 and the cradle 14. The pressure exerted on the log by the die members tends to cause an end portion of the log adjacent to the sheared face to spread laterally. Such spreading is limited by the die members 15 and 16. Spreading of a log having a maximum diameter within the tolerance range is prevented and spreading of slightly smaller logs is limited to a maximum value equal to the maximum diameter within the tolerance range. This ensures that the log can be moved out of and into the dies easily and ensures that a subsequent billet, incorporating that end portion of the log, can be inserted without difficulty into the barrel of an extrusion press.

When the shearing stroke of the die 12 has been completed, the clamp 25 is withdrawn from the log and the die members 15 and 16 are moved apart, so that the remaining portion of the log can be ejected easily from the die 12. The clamp 32 is withdrawn from the sheared billet, in order that the billet can be ejected easily from the die 12 onto the cradle 14.

Figure 2:
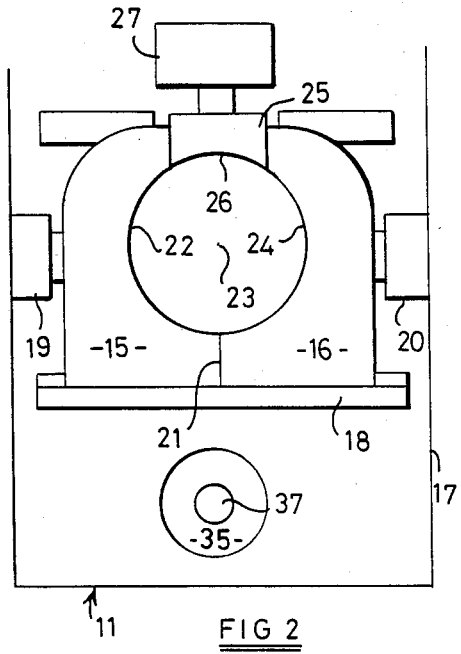
FIG. 2 is a diagrammatic representation of the stationary die, as viewed along its axis.

The stationary die 11 illustrated in FIG. 2 may be modified by the provision of a fourth component which is interposed between the die members 15 and 16 and occupies a position diametrically opposite to that of the clamp 25. Such fourth component would present a part of the internal face of the die and would not participate in movement of the die members, when the die is opened. The dimensions of the fourth component may be similar to those of the clamp 25.

Whilst the movable die 12 in the particular example described moves vertically to effect shearing of the log, it will be understood that the invention may be applied to shearing apparatus in which the shearing stroke is an horizontal stroke. In this case, the clamps would be spaced horizontally from the axes of their respective dies and the die members 15 and 16 would move towards and away from each other vertically.

What we claim is:

1. A method of shearing an elongated body comprising the steps of mutually aligning first and second dies, introducing into the dies the body to be sheared, providing a clearance between the body and the first die at at least one position around a longitudinal axis of the body, providing a clearance between the body and the second die at at least one position around the longitudinal axis of the body, contracting the first die in a first direction by movement of a clamp portion of the internal surface of the die in the first direction towards an opposite portion of the internal surface of the die to clamp the body in the first die, contracting the first die in a second direction transverse to the first direction, shearing the body by relative movement of the dies in said first direction and subsequently expanding the first die to release the sheared body.

2. A method according to claim 1 comprising the steps of contracting the second die in said first direction and subsequently expanding the second die.

3. Apparatus suitable for shearing elongated metal bodies and comprising first and second juxtaposed dies which receive a body to be sheared and which undergo relative movement to shear the body, wherein the first die is an assembly comprising a pair of opposite die members and a clamp, each of the opposite die members and the clamp presents a respective contact face for engagement with the body received by the dies, said contact faces are spaced in respective different directions from an axis defined by the first die, the die members are movable towards and away from each other and the clamp is movable towards and away from the axis of the first die independently of said members, wherein the clamp is movable to a position in which it is spaced from the axis of the first die by a distance less than the minimum distance between the axis and either of the die members.

4. Apparatus according to claim 3 wherein a plane which is perpendicular to the die axis intersects each of said contact faces.

5. Apparatus according to claim 4 wherein the contact faces of the die members and of the clamp all extend substantially to the interface between the first and second dies.

6. Apparatus according to claim 3 wherein the contact face of each of the die members subtends at the axis of the first die an angle in the range 90° to 160°.

7. Apparatus according to claim 3 wherein the contact face of each of said die members includes a portion which is substantially parallel to the direction of movement of the die members towards and away from each other.

8. Apparatus suitable for shearing elongated metal bodies and comprising first and second juxtapositioned dies which receive a body to be sheared and which undergo relative movement to shear the body, wherein the first die is an assembly comprising a pair of opposite die members and a clamp, each of the opposite die members and the clamp presents a respective contact face for engagement with the body received by the dies, said contact faces are spaced in respective different directions from an axis defined by the first die, the die members are movable towards and away from each other, the clamp lies between respective faces of the die members and the clamp is movable towards and away from the axis of the first die independently of said members.

* * * * *